UNITED STATES PATENT OFFICE.

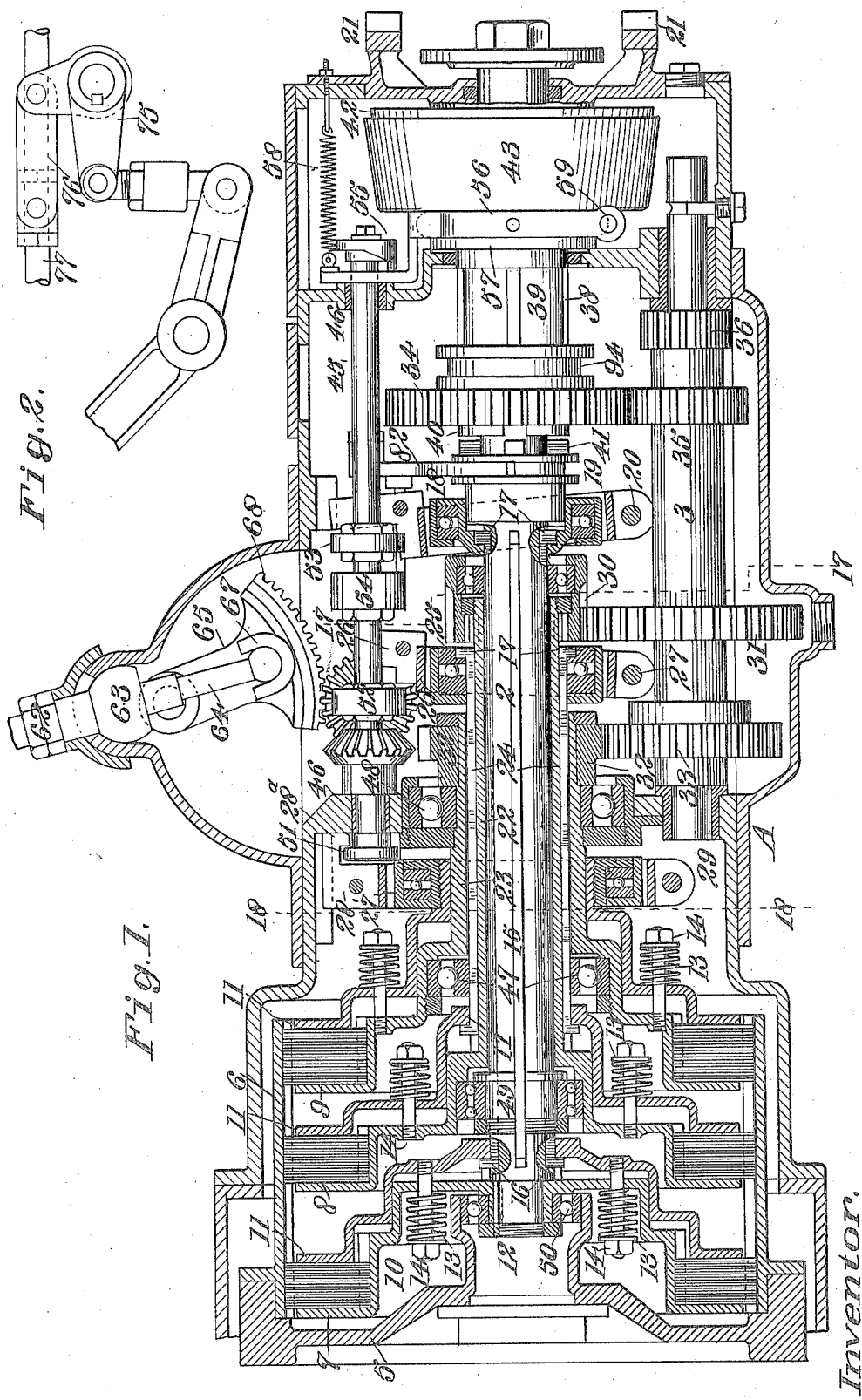

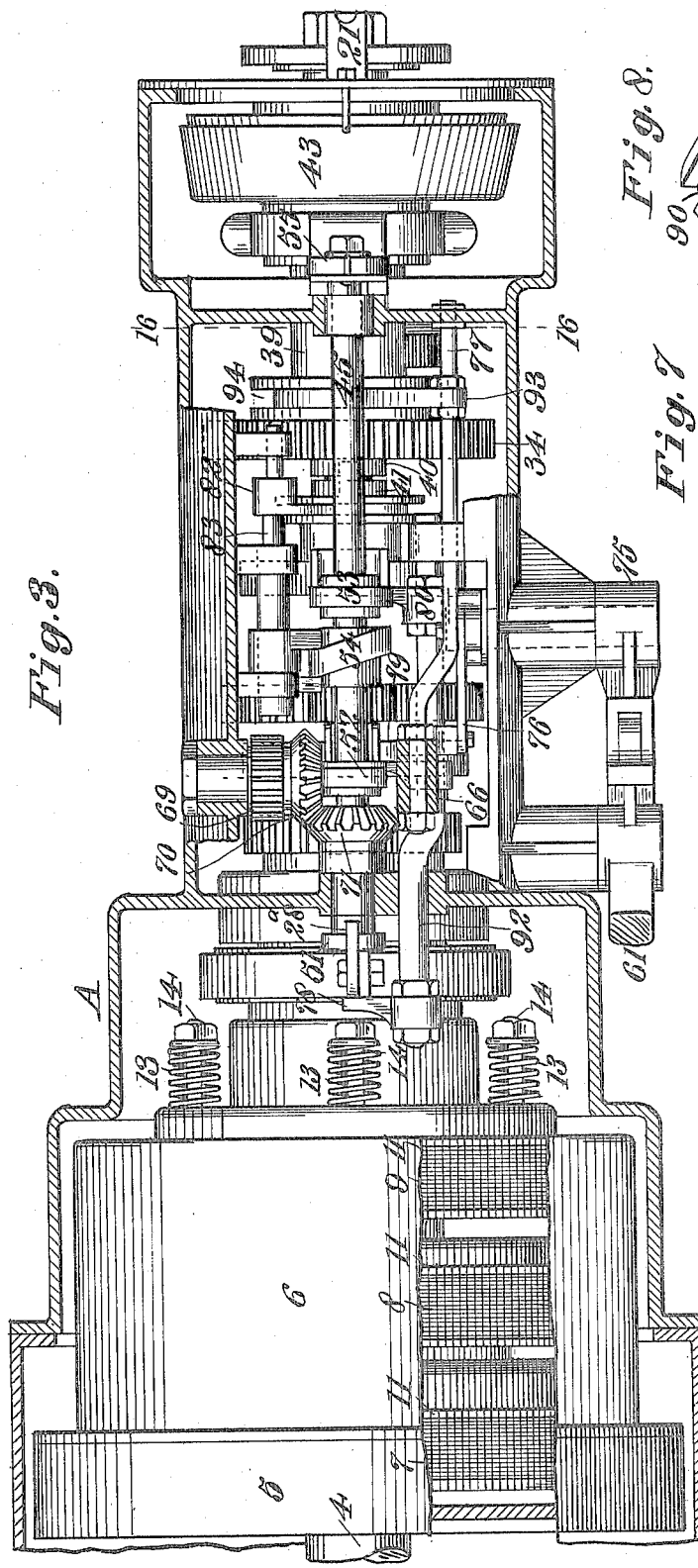

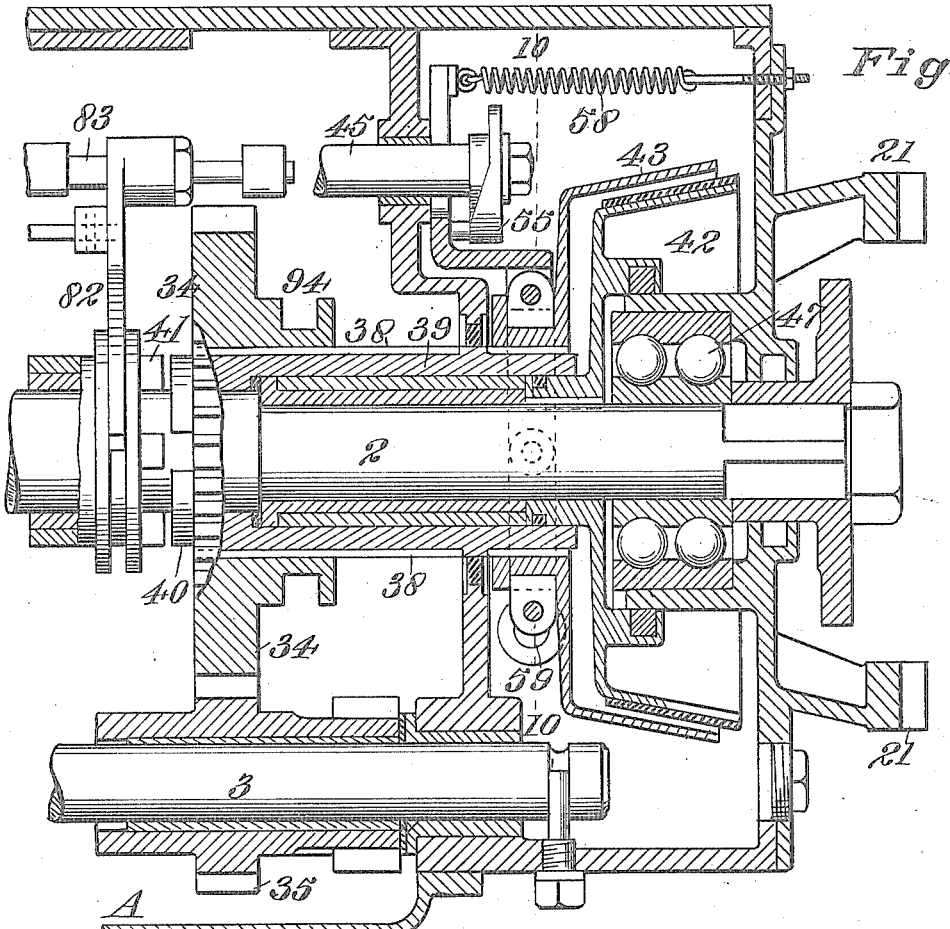
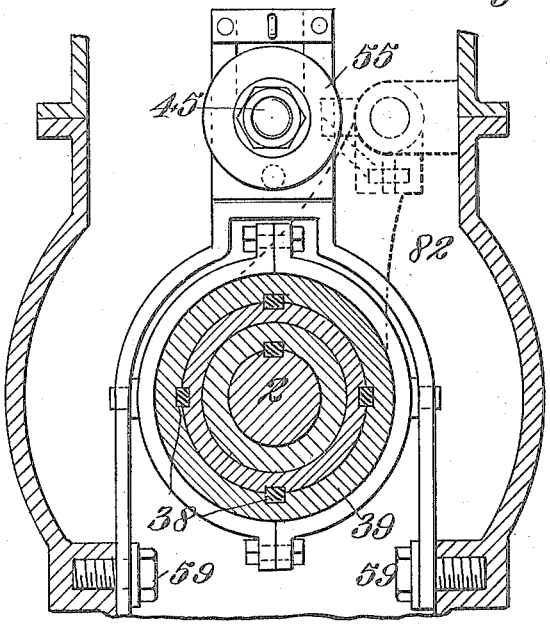
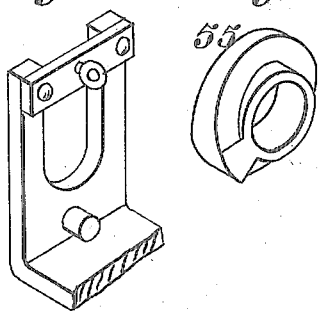

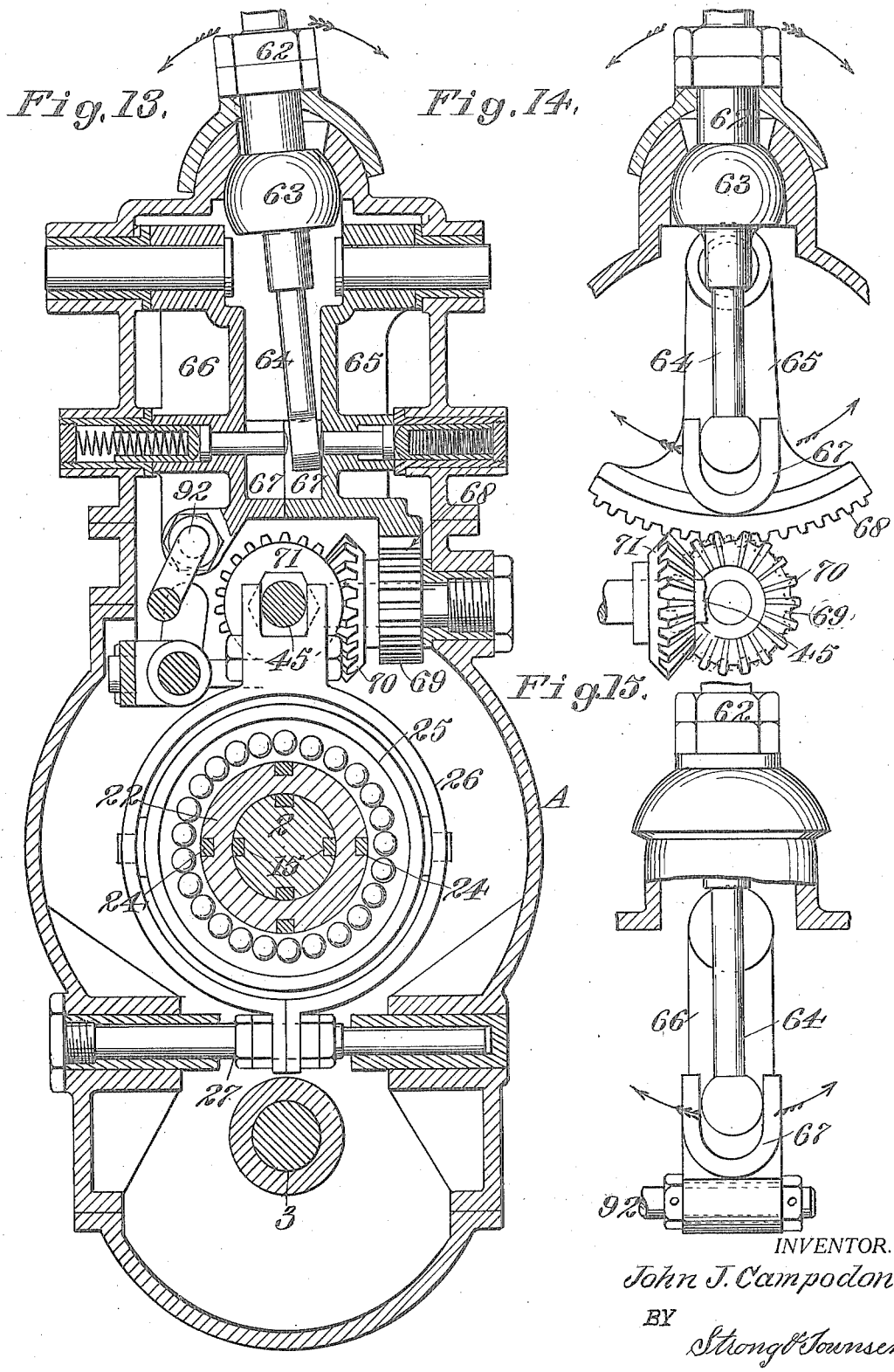

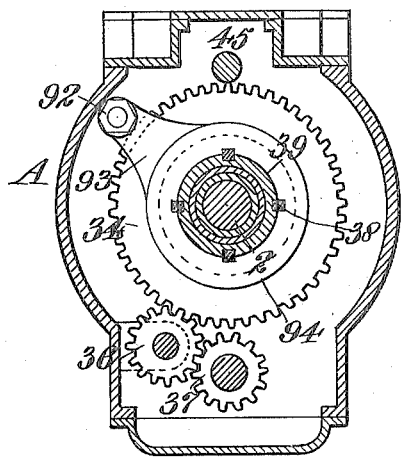
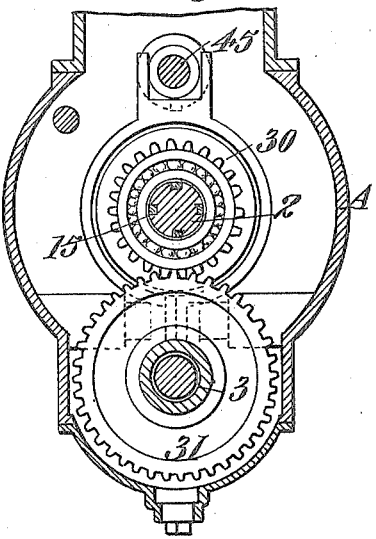
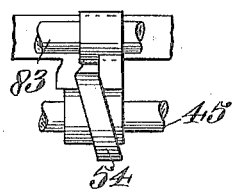
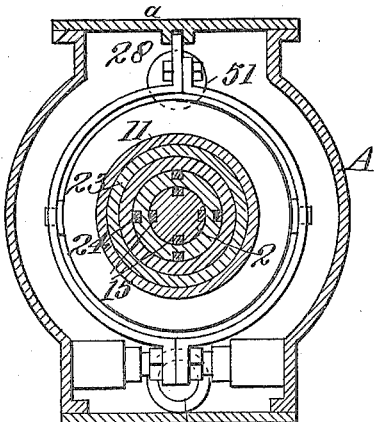
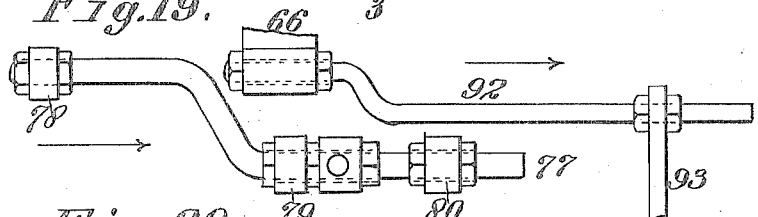
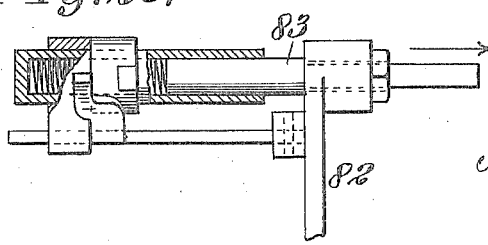

JOHN J. CAMPODONICO, OF STOCKTON, CALIFORNIA.

TRANSMISSION MECHANISM.

1,284,057.   Specification of Letters Patent.   Patented Nov. 5, 1918.

Application filed December 20, 1917. Serial No. 208,040.

*To all whom it may concern:*

Be it known that I, JOHN J. CAMPODONICO, a citizen of the United States, residing at Stockton, in the county of San Joaquin and State of California, have invented new and useful Improvements in Transmission Mechanism, of which the following is a specification.

This invention relates to a transmission mechanism, and particularly to improvements on the structure shown in my copending application entitled "Transmission", Serial Number 118,552, filed September 5th, 1916.

One of the objects of the present invention is to provide a simple, compact transmission mechanism which may be operated either on the selective or progressive principle, and in which changes from a direct drive to a low or intermediate drive may be made without shifting gears and in which separate clutches are used for each drive. Another object of the invention is to provide a transmission mechanism which employs a drive shaft, a transmission shaft and a countershaft, and in which a direct drive may be transmitted from the drive shaft to the transmission shaft without imparting rotation to the countershaft. Another object of the invention is to provide a transmission mechanism of the character described in which an intermediate or low drive may be transmitted from the driving shaft, through the countershaft, to the transmission shaft, and in conjunction therewith to provide means for imparting a preliminary and a final twirling movement to the countershaft before power is transmitted therethrough. Another object of the invention is to provide a new and novel mechanism for automatically performing said twirling operations when changing from a direct drive to a low or intermediate drive; and also to provide means for automatically controlling the position of the driving clutches. Further objects will hereinafter appear.

The invention consists of the parts and the construction and combination of parts as hereinafter more fully described and claimed, having reference to the accompanying drawings, in which—

Figure 1 is a central, vertical, longitudinal section through the transmission case, showing certain parts in elevation.

Fig. 2 is a detail side elevation of part of the clutch pedal and connected operating mechanism.

Fig. 3 is a plan view of the transmission case, parts being broken away and parts being in section.

Fig. 4 is a perspective view of the upper end of the intermediate clutch-shifting yoke.

Fig. 5 is a perspective view of the yoke locking collar which operates in conjunction with the intermediate yoke.

Fig. 6 is a perspective view of the locking collar which operates in conjunction with the low clutch-shifting yoke.

Fig. 7 is a perspective view of the upper end of the low clutch-shifting yoke and also the finger by which the yoke is moved to disengage the clutch.

Fig. 8 is a perspective view of the locking collar which operates in conjunction with the direct clutch-shifting yoke.

Fig. 9 is an enlarged, vertical, longitudinal, detail section through the twirling clutch with connected operating mechanism.

Fig. 10 is a cross section, taken on the line 10—10 of Fig. 9.

Fig. 11 is a perspective view of the upper end of the twirling clutch-operating yoke.

Fig. 12 is a perspective view of the cam by which the twirling clutch yoke is operated.

Fig. 13 is a vertical cross section of the transmission case, taken on a line just ahead of the shifting lever.

Fig. 14 is a detail side elevation of the shifting lever with connected operating mechanism.

Fig. 15 is another detail view of the shifting lever.

Fig. 16 is a vertical cross section on line 16—16 of Fig. 3.

Fig. 17 is a cross section on line 17—17 of Fig. 1 but drawn on a reduced scale.

Fig. 18 is a similar section also on a reduced scale, taken on the line 18—18 of Fig. 1.

Fig. 19 is a plan view of the reversing rod and the clutch rod, showing the relative positions of same.

Fig. 20 is a detail side elevation, partly in section, of the jaw clutch shifting rod.

Fig. 21 is a plan view of the jaw clutch shifting cam.

Referring to the drawings in detail, A indicates a transmission casing, in which is journaled a transmission shaft 2 and a countershaft 3. Secured on the main driving or engine shaft 4 is a fly-wheel 5, and forming an extension of said fly-wheel is a drum 6. Mounted interiorly of said drum-like extension are three multiple disk clutches 7, 8 and 9, respectively. The clutch 7 will hereinafter be known as the direct clutch, the clutch 8 as the low clutch, and the clutch 9 as the intermediate clutch.

The multiple disk clutches employed are standard in construction and consist of two sections. For instance, referring to the direct driving clutch, it will be seen that it consists of a section 10, which is rigidly keyed or otherwise secured to the transmission shaft 2, and a second section 11, which is slidable on a feather on the transmission shaft, as shown at 12; one set of disks being secured or keyed to the section 10 while each alternate disk is keyed or secured to the drum extension 6 on the fly-wheel. Movement of the section 11 of the clutch, therefore, permits engagement or disengagement in the usual manner, the disks in each clutch being normally held in driving engagement by means of springs 13 which surround stud bolts 14 secured to the movable sections 11 of the clutches.

The movable section 11 on each clutch is connected with a shifting collar and a pivotally mounted yoke to permit the clutches to be thrown when desired. This is accomplished, as far as the direct driving clutch is concerned, by providing a plurality of slidably mounted key members 15. These keys are mounted in the transmission shaft and their inner ends are turned up, as shown at 16, to engage the inner face of the movable section 11, while their opposite ends are turned up, as at 17, to engage an inner shoulder formed on a shifting collar 18. This collar is in turn slidably mounted on the transmission shaft and shifted longitudinally thereon by means of a yoke 19 which is pivotally mounted in the transmission casing, as at 20. The transmission shaft extends clear through the casing and is connected to the propeller shaft by a universal or other suitable joint, such as shown at 21. The countershaft is permitted to be at rest when a direct drive is being transmitted through the transmission shaft and is only employed when the intermediate or low clutch is employed.

The manner of transmitting power from the engine shaft to the countershaft and from the countershaft to the transmission shaft is in the following: Surrounding the transmission shaft is a sleeve shaft 22 and surrounding the sleeve shaft is a second sleeve shaft 23. The first or innermost sleeve shaft 22 carries the low driving clutch, while the second or exterior sleeve shaft carries the intermediate clutch. Both of these clutches are identical in construction to the direct driving clutch just described, and they are also thrown into and out of engagement by a similar mechanism to that described. That is, the innermost sleeve shaft is provided with a set of sliding keys 24 which are connected with a shifting collar 25 and a yoke 26 which is pivotally mounted in the casing, as at 27, while the exterior sleeve shaft is directly connected with a shifting collar 27' and a yoke 28 which is pivotally mounted in the casing, as at 29.

The innermost sleeve will hereinafter be termed the low clutch shaft and the exterior sleeve the intermediate clutch shaft. Secured on the low clutch shaft is a driving pinion 30 which remains in constant mesh with a gear 31 secured on the countershaft, and secured on the intermediate clutch shaft is a pinion 32 which remains in constant mesh with a gear 33, also secured on the countershaft. The gears 30 and 31 transmit the low speed drive and are also employed when the transmission is reversed, while the gears 32 and 33 are employed when an intermediate speed is being transmitted. The transmission is also provided with four more gears, one being a gear which is slidably mounted on the transmission shaft, as shown at 34, to permit it to be moved into mesh either with a gear shown at 35 or a reversing idler 36 which intermeshes with a gear 37 secured on the countershaft 2. The gear 34 is only shifted when a reverse drive is desired but is otherwise permitted to remain in mesh with the gear 35, as shown in Fig. 1.

The gear 34 is slidably mounted on a feather 38 secured in a sleeve shaft 39 which is journaled on the rear end of the transmission shaft 2 (see Fig. 9). The forward face of this sleeve shaft it provided with a jaw clutch 40 which is adapted to coöperate with a jaw clutch 41 which is slidably mounted on a feather on the transmission shaft. This jaw clutch is adapted to interlock with the clutch on the sleeve shaft 39 and interlocking of said clutches only takes place when a variable speed, either low or intermediate, is being transmitted. The clutches will, of course, remain out of engagement with each other when a direct drive is being transmitted, thereby permitting gear 34 and the countershaft to remain at rest during the transmission of a direct drive.

Keyed and rigidly secured near the end of the transmission shaft is a cone clutch 42, and slidably mounted on a feather on the sleeve shaft 39 is a coöperating cone clutch 43. The clutch members 42 and 43 will hereinafter be known as the twirling clutch.

This clutch is provided for the purpose of transmitting a revolving movement to the countershaft when it is desired to change from a direct drive either to low or to intermediate.

The preliminary transmission of revolving movement to the countershaft is of great importance when changing from direct either to low or intermediate as the transmission gears always remain in mesh. The importance of this intermediate twirling movement transmitted to the countershaft can readily be appreciated when it is realized that the countershaft remains at rest when a direct drive is taking place. A sudden change from direct to intermediate or low would throw the entire strain of bringing the countershaft up to speed upon the clutches and the gear teeth. However, this is obviated by the provision of the twirling clutch as it transmits a preliminary revolving movement to the countershaft which brings this up to uniform speed with the transmission shaft before the speed change is made, and it also permits the teeth on the jaw clutch sections 40 and 41 to enter freely without breaking the jaw sections when the speeds are uniform, while a difference in speed would naturally cause said jaw sections to strike and possibly break before engagement is made.

The operation of the twirling clutch and the engagement of the jaw clutch is automatically controlled from a cam shaft generally indicated at 45. This cam shaft also serves as a means for maintaining two or all of the clutches out of engagement and, furthermore, serves as a positive means for preventing more than one clutch being thrown into engagement at one time except under one stage of the operation, as will hereinafter be described. The cam shaft is journaled in bearings, as shown at 46, while the transmission shaft is journaled in a pair of main bearings 47 and 48. The low clutch sleeve shaft and the intermediate clutch sleeve shaft are journaled exteriorly of the transmission shaft and while they might contact with each other, it is obvious that interposed ball bearings, such as shown at 49, are preferably employed, a ball bearing being also interposed between the forward end of the transmission shaft and the flywheel, as shown at 50. The friction losses are in this manner reduced to a minimum and wear and tear are also reduced. The countershaft while here shown as supported in ordinary journal boxes may also be provided with anti-friction ball bearings, if desired.

Mounted and rigidly secured upon the cam shaft 45 are three locking collars 51, 52 and 53 and also secured upon the same shaft are two cams 54 and 55. The cam 55 serves as a means for automatically throwing the twirling clutch into and out of engagement, this being permitted by providing a yoke 56 which engages a collar 57 secured to the sliding section 43 of the twirling clutch. The upper end of this yoke engages the cam 55 and turning movement of the shaft, therefore, causes the cam to throw the clutch out or into engagement with the cone 42. A spring 58 connected with the upper end of the yoke throws the clutch members into engagement while the cam forces the yoke rearwardly about its pivot 59 and thereby throws the clutch out of engagement. The cam 54 is more particularly shown in Figs. 1, 3, 20 and 21 and serves as a means for automatically throwing the jaw clutch into and out of engagement.

The locking collar 51, more particularly shown in Figs. 1 and 5, is provided with two notches, as shown at 59' and 60, and serves the purpose of locking the yoke 28, with connected clutch 9, in disengaged position and also serves as a means for automatically permitting said clutch to be thrown into engagement. The locking collar 52 serves as a means for positively holding the low clutch, with connected yoke, in disengaged position and also serves as a means for permitting said clutch to be manually thrown into engagement by means of a foot clutch pedal shown at 61 (see Fig. 2) which will hereinafter be more fully described. The locking collar 53 serves as a means for positively holding the direct clutch, with connected yoke, out of engagement and also serves as a means for permitting said clutch to be manually thrown into engagement by the foot pedal 61.

The cam shaft 45 must necessarily be revolved to perform the different operations described as far as the cams 54 and 55 are concerned and also to permit the locking collars 51, 52 and 53 to perform their operations. Revolving movement is transmitted to the shaft through a shifting lever 62 of the usual construction. This shifting lever is carried by a ball and socket joint 63 and its lower end is provided with an extension 64 which may be thrown into engagement with one or the other of a pair of rocker arms, shown at 65 and 66. The inner side of each rocking arm is provided with a U-shaped notch, such as shown at 67, for the reception of the extension 64 on the lower end of the shifting lever, thereby permitting movement of the shifting lever to be transmitted to rock either of the arms 65 or 66. The rocker arm 66 is only employed when a reverse drive is to be transmitted, as will hereinafter be described, while the opposite rocker arm is employed for all other operations.

Movement of the rocker arm 65 is transmitted to revolve the cam shaft in either one direction or the other approximately seven-eighths of a revolution. This is accomplished by forming a segmental gear rack 68 on the lower end of said arm which intermeshes with a spur gear 69 journaled on the stud shaft secured in one side of the transmission case. Formed integrally with the spur gear 69, or otherwise secured to same, is a bevel gear 70, and secured upon the cam shaft and intermeshing with said gear is a bevel gear 71.

By referring to Fig. 13, it will be seen that the shifting lever is thrown into engagement with the rocker arm 65 and that rocking movement of the shifting lever will, therefore, be transmitted to the rocker arm 65 and through the gears 69, 70 and 71 movement will be transmitted to revolve the cam shaft in one direction or the other.

The operation will be as follows: With the gears and clutches in the position shown in Fig. 1 and with the shifting lever 62 thrown to its extreme forward position a direct drive is transmitted, that is, the intermediate and low clutches are thrown out of engagement as is also the jaw clutch and the twirling clutch while the direct clutch 7 is thrown into engagement. Power is transmitted from the engine shaft directly through the transmission shaft 2 to the propeller shaft. The twirling clutch section 42 being keyed to the transmission shaft will, of course, revolve in unison with same, but the sliding member 43 of said clutch, together with the sleeve and gear 34 and also the countershaft with its gear, will always remain at rest. The sleeve shafts, both intermediate and low, with their connected clutches, will, of course, also remain at rest.

If it is desired to change from direct to intermediate it is first necessary to pull the shifting lever 62 rearwardly a slight distance. This movement of the shifting lever transmits a corresponding revolving movement to the cam shaft and thereby brings the notch 59 in the locking collar 51 into alinement with a dog 28ª formed on the upper end of yoke 28 which is connected with the intermediate clutch 9. This alinement of the notch 59 with the dog permits the yoke to swing about its pivot in a forward direction, thereby throwing the intermediate clutch into engagement. This engagement of the intermediate clutch takes place while the direct clutch is still in engagement and permits a preliminary twirling movement to be transmitted to the countershaft.

It is now necessary to depress the foot or clutch pedal 61. Depression of the clutch pedal 61 is transmitted through a bell-crank 75, which in turn is connected through a link 76 with a shifting rod 77. This shifting rod is provided with three fingers 78, 79 and 80, mounted in alinement with the three yokes which are pivotally mounted at 26, 27 and 29, that is, the direct, the intermediate and the low clutch shifting yokes, the approximate position of a finger with relation to a yoke being shown in Fig. 7.

Depression of the foot pedal at this time transmits a movement to the shifting rod 77 which brings the respective fingers 78, 79 and 80 into engagement with the yokes and swings the yokes about their pivots to a point where all the clutches 7, 8 and 9 are thrown out of engagement. A still further movement in a rearward direction of the shifting lever 62 transmits a corresponding further revolution of the cam shaft and thereby brings the second notch 60 in the locking collar 51 into alinement with the dog 28ª of the yoke 28. Two other operations take place during the last rearward movement of the lever 62, to-wit, cam 55 turns into a position where it permits the spring 58 to pull the yoke 56 about its pivot 59 in a rearward direction, thereby permitting the clutch section 43 to engage the cone 42. This engagement of the twirling clutch is transmitted through the sleeve shaft 39 and gear 34 to revolve the countershaft. This is, of course, already revolving due to the previous engagement of the intermediate clutch, but as this revolution is only half that of the transmission shaft it can readily be seen that the engagement of the twirling clutch immediately raises the countershaft speed to a point where they both revolve in unison.

The cam 54 is turned into a position a moment after the engagement of the twirling clutch where it forces the jaw clutches 40 and 41 into engagement. This engagement is permitted as the twirling clutch has at this time raised the speed of the countershaft up to that of the transmission shaft. No rubbing of the jaw members will, therefore, take place, thereby permitting a perfect engagement without danger of breaking the teeth. The clutch pedal 61 may now be released and as the notch 60 is in alinement with the dog 28ª it can readily be seen that the intermediate clutch will engage and that power will be transmitted through same. The fly wheel transmits power through the intermediate clutch while the intermediate clutch transmits power through its sleeve shaft which carries the pinion 32. This gear intermeshes with gear 33 on the countershaft which in turn transmits power through gears 34 and 35 to revolve the sleeve shaft, and as the jaw clutch has already been thrown into engagement an intermediate speed is transmitted to the transmission shaft as the sleeve shaft 39 becomes locked through means of the jaw clutch, which, as previously described, is slidably mounted on a feather on the transmission shaft.

The connection between the cam 54 and the jaw clutch, consisting of the sections 40 and 41, is accomplished by forming a collar on the slidable jaw clutch section 41 which is engaged by a yoke 82. This yoke is secured to a rod 83 which is shifted in one direction or the other by means of the cam 54, the shape of which is more particularly shown in Fig. 21. The various changes or operations which take place when changing from direct to intermediate are all automatic. The only manual operation required is to pull the shifting lever 62 in a rearward direction until it assumes an approximately vertical position; the automatic operations being controlled entirely by the cam shaft and the cams and collars carried thereby. The most important functions taking place during the change from direct to intermediate is to transmit a preliminary twirling movement to the countershaft and a final twirling movement which brings the countershaft up to a speed where it revolves in unison with the transmission shaft. The intermediate clutch can, therefore, be thrown into engagement without subjecting the gear teeth to any shock or the clutch itself to any unnecessary strain, the change being in this manner made under ideal conditions.

If it is desired to change from intermediate to low, it is only necessary to depress the clutch pedal 61 and throw the intermediate gear out of engagement. The shifting lever 62 is then pulled rearwardly to its extreme rearmost position and thereby turns the cam shaft to a position where the notch in the collar 52 is in direct alinement with the dog on the low clutch shifting yoke. The clutch pedal 61 can then be released and the low clutch thrown into engagement as the alinement of the notch in the collar 52 permits the low clutch yoke to move forward and the clutch to engage. No twirling movement is transmitted when changing from intermediate to low as the countershaft is already revolving in unison with the transmission shaft.

If it is desired to change directly from low to direct it is accomplished by depressing the clutch pedal 61 and disengaging the low clutch. The shifting lever 62 is then thrown from its extreme rearmost position to its extreme foremost position shown in Fig. 1. This causes the cam shaft to make seven-eighths of a revolution in the opposite direction to that in which it previously revolved in making the changes described. This return movement or reversal of the cam shaft first releases the jaw clutch and then the twirling clutch and finally brings the notch 90 in the collar 53 into alinement with the direct clutch shifting yoke, thus permitting this to enter and the clutch to engage when the clutch pedal is released. A direct drive is then immediately transmitted through the transmission shaft and the sleeve shaft 39, together with the countershaft, is permitted to come to a rest as the jaw clutch is thrown out of engagement.

The intermediate and low clutches are also held out of engagement by their respective locking collars 51 and 52 and everything will remain at rest except the transmission shaft and the cone 42 which is keyed thereto. This will, of course, revolve as long as a direct drive is being transmitted.

If it is desired to transmit a reversing movement when the transmission is driving in low, it is only necessary to depress the clutch pedal 61 and disengage the low clutch. The shifting lever 62, as previously described, assumes its rearmost position when driving in low and as the clutch has already been released it is only necessary to rock it about the ball joint 63 laterally until the lower extension 64 enters the U-shaped pocket 65 on the opposite rocker arm 66. The shifting lever after this engagement has been made is thrown forward to the extreme predetermined position and thereby rocks the arm 66 about its pivot. This rocking movement of the arm 66 is transmitted through a shifting rod 92 (see Figs. 13 and 19) which is suitably supported in the transmission case and carries a yoke 93. This yoke straddles a collar 94 secured to the gear 34 and slides the gear 34 longitudinally on the sleeve in a rearward direction until it intermeshes with the gears 36 and 37. The clutch pedal 61 is now released after the gear change has been made and power is then transmitted through the low clutch and the gears described, thereby causing a reverse movement to be imparted to the transmission shaft.

No movement of the cam shaft takes place when changing from low to reverse as the shifting lever is thrown out of engagement with the rocker arm 64. The cam shaft, therefore, positively remains at rest during this operation and does not change its position until the transmission is again thrown out of the reverse and the low entered. In fact, it does not change its position until the low drive is left and it is desired to enter either the intermediate or high.

By referring to Figs. 5 and 8, which are perspective views of the locking collars 51 and 53 or what may be termed the intermediate and direct locking collars, it will be seen that the notch 90 in the direct collar is considerably wide. The notch 90 corresponds to the notch 59' on the collar 51 but as it is more than twice as wide as the notch 59' it permits the cam shaft to turn while the direct clutch is still remaining in engagement and until the notch 59' registers with the yoke 28. The total width of the notch 90 permits a partial revolution of the cam shaft which is sufficient to bring the notch 59' into alinement with the dog 28ᵃ of the yoke and thereby permits the intermediate clutch to engage while the direct clutch still remains in engagement. This, of course, takes place for the purpose of permitting a preliminary twirling movement to be transmitted to the countershaft previous to the time period when the twirling clutch is thrown into engagement. This is of considerable importance as it relieves the twirling clutch of the strain which would otherwise be imposed upon it if the countershaft was standing entirely still when it engaged. It also relieves the gears in the transmission and the gears on the rear drive shaft from shock and unnecessary strains which would otherwise be imposed.

The main features or improvements in the present invention over my co-pending application previously referred to consist in the provision of the countershaft, together with the cams and locking collars carried thereby, which not only automatically perform the several operations described but also serve as a means for positively maintaining two clutches out of engagement while one clutch may be manually thrown into or out of engagement. This cam shaft also permits both the intermediate and direct clutches to remain in engagement while the preliminary twirling movement is transmitted, but it otherwise serves as a means for permitting only one clutch to engage at a time. Another feature of the present invention is the construction and mounting of the twirling clutch and also the mechanism employed in connection with the shifting lever 62 for transmitting revolving movement to the cam shaft and for making the reverse gear change described. Other improvements consist in the construction and arrangement of the several parts and while these are specifically shown and described it should be understood that I do not wish to limit myself to the specific construction and arrangement here shown. Also the materials and finish of the several parts of the device herein employed may be such as the experience and judgment of the manufacture may dictate.

Having thus described my invention, what I claim and desire to secure by Letters Patent is—

1. In a transmission mechanism, a drive shaft, a countershaft, a transmission shaft, means for transmitting power directly from the drive shaft to the transmission shaft, means for transmitting variable speeds through the drive shaft and countershaft to the transmission shaft, means for transmitting a preliminary twirling movement to the countershaft when changing from a direct drive to a variable speed drive, and a second means for transmitting a final twirling movement to the countershaft which will raise the speed of the countershaft so that it will travel in unison with the transmission shaft before a variable speed can be transmitted.

2. In a transmission mechanism, a drive shaft, a transmission shaft, a counter-shaft, means for transmitting a direct drive through the drive shaft and the transmission shaft, means for transmitting an intermediate speed or a low speed from the drive shaft through the countershaft to the transmission shaft, a clutch adapted to connect the drive shaft with the transmission shaft when a direct drive is transmitted, a clutch adapted to transmit power from the drive shaft to the countershaft when an intermediate drive is to be transmitted, a clutch adapted to transmit power from the engine shaft to the countershaft when a low speed is to be transmitted, a cam shaft, means for revolving said cam shaft, and means carried by the cam shaft permitting only one clutch to be thrown into engagement, said means also adapted to positively lock the other two clutches against engagement when power is being transmitted.

3. In a transmission mechanism, a drive shaft, a transmission shaft, a countershaft, means for transmitting a direct drive through the drive shaft and the transmission shaft, means for transmitting an intermediate speed or a low speed from the drive shaft through the countershaft to the transmission shaft, a clutch adapted to connect the drive shaft with the transmission shaft when a direct drive is transmitted, a clutch adapted to transmit power from the drive shaft to the countershaft when an intermediate drive is to be transmitted, a clutch adapted to transmit power from the engine shaft to the countershaft when a low speed is to be transmitted, a cam shaft, means for revolving said cam shaft, means carried by the cam shaft permitting only one clutch to be thrown into engagement, said means also adapted to positively lock the other two clutches against engagement when power is being transmitted, said means comprising a plurality of collars secured upon the cam shaft, said collars having notches formed therein positioned out of alinement with each other, and a pivotally mounted yoke positioned adjacent to each collar, said yokes being connected one with each clutch and adapted to throw said clutches into and out of engagement, said yokes engaging the collars and normally holding the clutches out of engagement but permitting engagement when a yoke drops into a notch.

4. In a transmission mechanism, a drive shaft, a countershaft, a transmission shaft, means for transmitting power directly from the drive shaft to the transmission shaft, means for transmitting variable speeds through the drive shaft and countershaft to the transmission shaft, means for transmitting a preliminary twirling movement to the countershaft when changing from a direct drive to a variable speed drive, a second means for transmitting a final twirling movement to the countershaft which will raise the speed of the countershaft so that it will travel in unison with the transmission shaft before a variable speed can be transmitted.

5. In a transmission mechanism, a drive shaft, a countershaft, a transmission shaft, means for transmitting power directly from the drive shaft to the transmission shaft, means for transmitting variable speeds through the drive shaft and countershaft to the transmission shaft, means for transmitting a preliminary twirling movement to the countershaft when changing from a direct drive to a variable speed drive, a second means for transmitting a final twirling movement to the countershaft which will raise the speed of the countershaft so that it will travel in unison with the transmission shaft before a variable speed can be transmitted, and a manually operated mechanism for changing from a direct to a variable speed drive.

6. In a transmission mechanism, a drive shaft, a transmission shaft, an intermediate shaft, a low shaft, a countershaft, a clutch adapted to connect the transmission shaft and the drive shaft, a clutch adapted to connect the intermediate shaft with the drive shaft and the countershaft, a clutch adapted to connect the low shaft with the drive shaft and the countershaft, a clutch adapted to connect the countershaft with the intermediate shaft, means for throwing the first three named clutches out of engagement, means permitting only one of said clutches to return to engagement when a low, an intermediate or a direct drive is being transmitted, means for automatically throwing the last named clutch into engagement when changing from a direct drive to low or intermediate, and means for transmitting a twirling movement to the countershaft when changing from direct to low or intermediate before said last named clutch is automatically thrown into engagement.

7. A transmission mechanism comprising a casing, a drive shaft entering the casing, a transmission shaft journaled in the casing, an intermediate shaft journaled exteriorly of the transmission shaft, a low shaft journaled exteriorly of the intermediate shaft, a clutch for each of said shafts adapted to connect any one of said shafts with the drive shaft, a countershaft, a sleeve shaft journaled on one end to the transmission shaft, a jaw clutch adapted to connect said sleeve with the transmission shaft, means for transmitting power from either the low or intermediate shaft to the counter-shaft, means for transmitting power from the countershaft through the last named sleeve shaft and the jaw clutch to the transmission shaft, manually operated means for throwing the direct, the intermediate and the low clutch into or out of engagement, means for automatically preventing more than one of said clutches from returning to engagement when either a direct, low, or intermediate speed is being transmitted, and means for automatically throwing the jaw clutch into engagement when an intermediate or low speed is being transmitted.

8. A transmission mechanism comprising a casing, a drive shaft entering the casing, a transmission shaft journaled in the casing, an intermediate shaft journaled exteriorly of the transmission shaft, a low shaft journaled exteriorly of the intermediate shaft, a clutch for each of said shafts adapted to connect any one of said shafts with the drive shaft, a countershaft, a sleeve shaft journaled on one end of the transmission shaft, a jaw clutch adapted to connect said sleeve with the transmission shaft, means for transmitting power from either the low or intermediate shaft to the countershaft, means for transmitting power from the countershaft through the last named sleeve shaft and the jaw clutch to the transmission shaft, manually operated means for throwing the direct, the intermediate and the low clutch into or out of engagement, means for automatically preventing more than one of said clutches from returning to engagement when either a direct, low or intermediate speed is being transmitted, means for automatically throwing the jaw clutch into engagement when an intermediate or low speed is being transmitted, means for automatically transmitting a preliminary twirling movement to the countershaft when a low or intermediate speed is to be transmitted, means for automatically transmitting a final twirling movement to the countershaft before the jaw clutch engages when an intermediate or low speed is to be transmitted, and means for automatically preventing either the low or intermediate clutch from engaging before the jaw clutch has been thrown into engagement.

9. In a transmission mechanism, a drive shaft, a transmission shaft, a countershaft, means for transmitting power from the drive shaft directly to the transmission shaft, means for transmitting power from the drive shaft through the countershaft to the transmission shaft, and means for transmitting a preliminary twirling movement and a final twirling movement to the countershaft before transmitting power therethrough.

10. In a transmission mechanism, a drive shaft, a transmission shaft, a countershaft, means for transmitting power from the drive shaft directly to the transmission shaft, means for transmitting power from the drive shaft through the countershaft to the transmission shaft, means for transmitting a preliminary twirling movement and a final twirling movement to the countershaft before transmitting power therethrough, said means comprising a friction clutch secured to the transmission shaft, a sleeve shaft turnably mounted on said shaft, a gear secured on said sleeve shaft intermeshing with a gear secured on the countershaft, a friction clutch slidably mounted on the sleeve shaft adapted to engage the first named clutch to transmit the preliminary twirling movement, a jaw clutch member on the sleeve shaft, and a coöperating jaw clutch member slidably mounted on the transmission shaft adapted to engage the jaw clutch member on the sleeve shaft to transmit the final twirling movement.

In testimony whereof I have hereunto set my hand in the presence of two subscribing witnesses.

JOHN J. CAMPODONICO.

Witnesses:
JOHN H. HERRING,
W. W. HEALEY.